United States Patent [19]

Ishii et al.

[11] 4,412,010

[45] Oct. 25, 1983

[54] ARC RESISTANT INSULATOR

[75] Inventors: Isao Ishii; Tadaki Murakami; Yoshiaki Sakamoto; Yoshikazu Utsumi, all of Amagasaki; Tatsuharu Nakamura; Hiroshi Takayanagi, both of Sanda, all of Japan

[73] Assignee: Mitsubishi Denki Kabushiki Kaisha, Tokyo, Japan

[21] Appl. No.: 378,382

[22] Filed: May 14, 1982

[30] Foreign Application Priority Data

May 15, 1981 [JP] Japan .................................. 56-73170

[51] Int. Cl.$^3$ ............................................. C04B 35/10
[52] U.S. Cl. ............................. 501/153; 106/DIG. 3
[58] Field of Search .................. 106/DIG. 3; 501/153

[56] References Cited

U.S. PATENT DOCUMENTS 3,310,411 3/1967 Vedder et al. ...................... 501/153
3,827,892 8/1974 McCauley .................... 106/DIG. 3

OTHER PUBLICATIONS

Y. Utsumi et al, "Reaction Mechanism of $H_3BO_3$–ZnO Bonding Material Under Hot-Pressing and Heat Treatment," *Journal of the American Ceramic Society*, vol. 64, No. 11, Nov. 1981.

*Primary Examiner*—James Poer
*Attorney, Agent, or Firm*—Oblon, Fisher, Spivak, McClelland & Maier

[57] ABSTRACT

An arc resistant insulator composed of a composite composition comprising an insulating base material and a zinc borate hydrate. The insulating base material is composed of aluminum oxide and/or aluminum hydroxide and mica power. The zinc borate hydrate is composed essentially of $2ZnO.3B_2O_3.3H_2O$. The arc resistant insulator is prepared by mixing the insulating base material with a zinc borate hydrate forming material composed of normal boric acid, boric acid anhydride and zinc oxide and heating and compacting the mixture thus obtained in a closed system at a temperature of at least 155° C. under pressure of at least 50 kg/cm$^2$.

10 Claims, No Drawings

ARC RESISTANT INSULATOR

BACKGROUND OF THE INVENTION

1. Field of the Invention

The present invention relates to an arc resistant insulator which is suitable for use, for instance, as an arc-extinguishing plate for a blow-out type circuit breaker, and a process for its preparation.

2. Description of the Prior Art

Various types of arc resistant insulators are used including asbestos products prepared by binding asbestos fibers with phosphoric acid or a metal phosphate and cement, or porcelain products made of cordierite, zircon or the like.

The asbestos products are superior in the arc-extinguishing performance and have high strength, particularly high impact strength by virtue of the fibrous asbestos, and they are useful as arc-extinguishing plates for e.g. unit switches for vehicles which are subject to vibrations. The arc-extinguishing performance of the asbestos products is largely dependent on the moisture (adsorption water and constitution water) contained in the asbestos, and the moisture acts effectively against arcs at the initial stage by diffusing and cooling the arcs, whereby good results are obtainable with a short breaking time. However, when subjected to arcs repeatedly, the asbestos products will lose the moisture, and at the same time, the fiber structures of the asbestos will be destroyed to form glass and will undergo undesirable deformation which is so-called shrinkage.

Further, the asbestos products are generally inferior in their electrical insulating performance in a high humidity atmosphere and accordingly they are restricted in the range of applications as insulators.

On the other hand, the porcelain products are made of material having a high melting point. When subjected to arcs, they form a glassy texture, but do not undergo substantial deformation as contrasted to the asbestos products. Thus, they are good arc resistant insulators. However, the porcelain products are inferior in their impact strength, and accordingly they are not very much suitable for use under high vibration conditions, e.g. for use in vehicles. Besides, they present a difficulty in the dimensional precision.

SUMMARY OF THE INVENTION

It is an object of the present invention to overcome the above-mentioned difficulties inherent to the conventional products and to provide an arc-resistant insulator which does not undergo shrinkage when subjected to arcs and which has superior arc-extinguishing efficiency and anti-shock strength as well as superior water resistance, heat resistance and electrical insulation property.

It has been found that the above object can be accomplished by providing an arc resistant insulator which is composed of a matrix of a composite composition comprising an insulating base material containing aluminum oxide and/or aluminum hydroxide and mica powder and a zinc borate hydrate composed essentially of $2ZnO.3B_2O_3.3H_2O$.

The arc resistant insulator can be prepared by mixing an insulating base material composed of aluminum oxide and/or aluminum hydroxide and mica powder with a zinc borate hydrate forming material composed of normal boric acid, boric acid anhydride and zinc oxide, and heating and compacting the mixture thus obtained in a closed system at a temperature of at least 155° C. under pressure of at least 50 kg/cm² to form a formed product.

DETAILED DESCRIPTION OF THE PREFERRED EMBODIMENTS

Specifically, the insulating base material comprises 1 part by weight of aluminum oxide and/or aluminum hydroxide and from 0.2 to 1 part by weight of mica powder. As the material for forming the zinc borate hydrate composed essentially of $2ZnO.3B_2O_3.3H_2O$, there may preferably be used a mixture of normal boric acid, boric acid anhydride and zinc oxide. The mixture is preferably composed of from 3 to 7 moles of normal boric acid, 1 mole of boric acid anhydride and from 2.5 to 4.5 moles of zinc oxide.

The insulating base material and the material for forming the zinc borate hydrate are mixed to form a mixture (hereinafter referred to as "forming material"), which is then heated and compacted to obtain a formed product. The content of the insulating base material in the forming material is preferably from 50 to 75% by weight. The heat compacting process is usually carried out by filling the forming material in a metal mold, heating it at a temperature of at least 155° C. and compacting it under pressure of at least 50 kg/cm² to obtain a formed product.

This process is preferably conducted under a condition such that the water generated by the thermal transformation of the normal boric acid is maintained in the metal mold. Namely, it is preferred that the clearance within the metal mold is minimized, and the metal mold has a closed structure, and that the forming material is fed while the metal mold is held at a low temperature, and after filling the forming material, it is immediately compacted under heating. The formed product thus obtained contains the insulating base material, i.e. aluminum oxide and/or aluminum hydroxide and mica powder, the zinc borate hydrate formed which is composed essentially of $2ZnO.3B_2O_3.3H_2O$ and a certain amount of water, in a form of a composite composition.

Then, this composite composition is subjected to heat treatment at a temperature of from 160° to 200° C. to promote the formation of the zinc borate hydrate and to remove the residual water, whereupon the intended arc resistant insulator of the present invention is obtained.

Now, each of the constituent materials will be described. Firstly, the aluminum oxide and/or aluminum hydroxide are insulating materials having superior arc resistance against arcs, and when subjected to arcs in the form of a constituent of the insulator of the present invention, they are partly formed into crystalline glass which has good affinity to the base material of the insulator, and accordingly even when arcs are applied repeatedly, the formed crystalline glass does not fall off, and thus the insulator becomes highly durable. Especially, the aluminum hydroxide is thermally transformed by the arcs into aluminum oxide and water, and the water thus formed serves effectively to improve the arc-extinguishing performance. The glassy substance thus formed by impingement of the arcs is the same as that of aluminum oxide and does not wear out as contrasted with the asbestos products. Therefore, needless to say, a mixture of aluminum oxide and aluminum hydroxide is similarly effective.

Mica powder is used as a reinforcing material to maintain the strength of the insulator. Mica powder itself has a high heat resistance temperature at a level of from 800° to 1200° C. and a superior electrical insulating property. Mica powder is a layered substance, thus serves to prevent diffusion of water in the forming material during the heat compacting process, and has little water absorption property. Thus, the mica powder is extremely effective to form the zinc borate hydrate composed essentially of $2ZnO.3B_2O_3.3H_2O$.

As such mica powder, there may be used any type such as natural mica powder or synthetic mica powder. The particle size thereof is preferably within a range of from 50 to 150 mesh. If the particle size is larger than 50 mesh, the material composition tends to be non-homogeneous and thus likely to lead to a fluctuation of the property, especially a fluctuation of the strength. On the other hand, if the particle size exceeds 150 mesh, the impact strength tends to be degraded.

The insulating base material is prepared by mixing the aluminum oxide and/or aluminum hydroxide with the mica powder. It is preferred to mix 1 part by weight of the aluminum oxide and/or aluminum hydroxide and from 0.2 to 1.0 by weight of the mica powder. If the amount of the mica powder is less than 0.2 part by weight, the strength, especially the impact strength tends to be degraded. On the other hand, if the amount of the mica powder exceeds 1.0 part by weight, the arc resistance tends to be degraded and the arc resistant property as measured by JIS K 6911 by means of an arc proof tester will be inferior.

With respect to the material for forming the zinc borate hydrate composed essentially of $2ZnO.3B_2O_3.3H_2O$, experiments have been repeated by X-ray diffractiometry to determine optimal ranges of the constituent materials to readily form the zinc borate hydrate by the heat compacting process and the subsequent heat treatment, and it has been found that the desired zinc borate hydrate can relatively easily be formed by using from 3 to 7 moles of normal boric acid, 1 mole of boric acid anhydride and from 2.5 to 4.5 moles of zinc oxide.

The formation of the zinc borate hydrate is necessary to improve the water resistance of the insulator. If the zinc borate hydrate is not formed in the insulator, e.g. if the normal boric acid, or boric acid anhydride remains in its thermally decomposed state, the water resistance of the insulator becomes to be poor, the electric insulating property under a high humidity condition becomes to be inferior, and no adequate heat resistance can be expected. Whereas, if the zinc borate hydrate is formed, it then undergoes the following transformation:

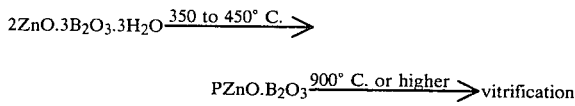

whereby the heat resistance and the arc resistance will also be improved. (In the case where no zinc borate hydrate is formed, or if the material remains in a form of e.g. metaboric acid, it undergoes vitrification at a temperature of from 180° to 200° C. thus leading to degradation of the heat resistance.)

According to the present invention, a composite composition comprising the above insulating material and the zinc borate hydrate is prepared and it has been successful to thereby obtain the desired arc resistant insulator having superior heat resistance, arc resistance and strength.

As mentioned above, the normal boric acid is used in a range of from 3 to 7 moles. If the amount is less than 3 moles, the amount of the resulting zinc borate hydrate decreases and the water resistance and the heat resistance tend to be poor. On the other hand, if the amount exceeds 7 moles, an adequate amount of the zinc borate hydrate will be formed, but a greater amount of water will then be present in the formed product, and the formed product tends to be porous thus leading to degradation of the strength.

The boric acid anhydride chemically reacts with water generated by the thermal transformation of the normal boric acid during the heat compacting process, and the reaction product then react with zinc oxide to form the zinc borate hydrate. However, if the boric acid anhydride is present in an amount greater than 1 mole, it will remain in the formed product in a form of $B_2O_3$ and in an unstable form combined with water, thus leading to degradation of the water resistance and the heat resistance. On the other hand, if the amount is less than 1 mole, the boric acid anhydride fully absorbs water generated by the thermal transformation of the normal boric acid during the heat compacting process, and the thus water modified substance thereof will then react with zinc oxide to form the zinc borate hydrate, but a substantial amount of water formed by the thermal transformation of the normal boric acid will still remain and therefore it will be difficult to obtain a formed product of fine structure.

The zinc oxide is an essential component to form the zinc borate hydrate, and it is preferably used in an amount within a range of from 2.5 to 4.5 moles relative to the above boric acid and boric acid anhydride. If the amount is less than 2.5 moles, the thermally transformed products of the normal boric acid and the boric acid anhydride will remain in the insulator thus leading to degradation of the heat resistance and the water resistance. On the other hand, if the amount exceeds 4.5 moles, the zinc borate hydrate will be formed but an excess amount of zinc oxide will remain in the insulator merely as a filler. Accordingly, if the amount if zinc oxide increases, the amounts of the normal boric acid and boric acid anhydride necessarily decrease thus leading to a decrease of the binding force for the insulating base material, whereby the final product tends to be inferior in the strength.

The insulating base material composed of a mixture of aluminum oxide and/or aluminum hydroxide and mica powder should preferably be present in the forming material in an amount of from 50 to 75% by weight. If the amount is less than 50% by weight, it is difficult to obtain an insulator having superior strength. On the other hand, if the amount exceeds 75% by weight, it is likewise difficult to obtain an insulator having superior strength (since the contents of the normal boric acid, boric acid anhydride and zinc oxide decrease relatively, and accordingly, the binding force for the insulating base material tends to be insufficient.)

The forming material thus prepared to have a predetermined ratio of these materials are heated and compacted to obtain a formed product. The heating temperature should be at least 155° C. at which the normal boric acid undergoes a thermal transformation actively. It is further necessary, when compacting the forming material under such a condition, to confine water generated by the thermal transformation of the normal boric acid in the formed product. Therefore, it is necessary to heat and compact the forming material in a closed system in e.g. a metal mold having a minimal clearance, to obtain the formed product. Further, it is necessary to fill the forming material into e.g. a metal mold while maintaining the temperature of the mold at a low level so that the feeding of the forming material can be conducted under the condition such that the thermal transformation of the normal boric acid in the forming material does not take place. If the water generated from the normal boric acid is permitted to escape from the forming material, it is hardly possible to form the zinc borate hydrate even by adjusting the composition of the materials in any way. The optimum temperatue range is from 160° to 200° C. and the pressure for compacting is at least 50 kg/cm$^2$. At a temperature lower than 155° C., the normal boric acid does not adequately undergo a thermal transformation, and the zinc borate is thereby hardly formed and no adequate binding force is thereby obtainable, whereby it is impossible to obtain the desired arc resistant insulator. On the other hand, if the temperature exceeds 200° C., the water generated by the thermal transformation of the boric acid moves actively and tends to dissipate out of the forming material, whereby the formation of the ainc borate hydrate will be reduced. Further, the production costs will increase as the heating temperature is raised. For these reasons, the abovementioned temperature range is most preferred.

The mica powder has a layer structure and does not absorb water, and thus it serves to entrap the water generated by the thermal transformation of the normal boric acid between the layers and forms closed structures effective for the formation of the zinc borate hydrate.

If asbestos fibers are used in place of the mica powder, a greater amount of water will be present because the asbestos fibers absorb water, and accordingly unless the composition of the materials is adjusted to accommodate such a great amount of water, the zinc borate hydrate will hardly be formed.

Then, the formed product obtained by the heat compacting process is subjected to heat treatment in e.g. a drier. This heat treatment is intended to remove the residual water and to promote the formation of the zinc borate hydrate, and the heat treatment is carried out at a temperature of from 160° to 200° C.

The arc resistant insulator of the present invention thus obtained, is a composite composition comprising aluminum oxide and/or aluminum hydroxide and mica powder as well as the zinc borate hydrate composed essentially of $2ZnO.3B_2O_3.3H_2O$ and has superior properties such as water resistance, heat resistance, arc resistance, strength and electrical insulation.

Now, the present invention will be described in further detail with reference to Examples.

EXAMPLE 1

380 g. of aluminum oxide ($Al_2O_3$, particle size: 200 to 300 mesh) and 237.5 g. of phlogopite powder ($KMg_3(AlSi_3O_{10})(OH)_2$, particle size: 60 to 100 mesh) as the mica powder, were mixed in Ishikawa-type mixer for 10 minutes to obtain an insulating base material.

On the other hand, 154.9 g. of normal boric acid ($H_3BO_3$, particle size: 40 to 80 mesh), 34.9 g. of boric acid anhydride ($B_2O_3$, particle size: 40 to 80 mesh) and 142.7 g. of zinc oxide (ZnO, particle size: 1 to 10$\mu$) were mixed in Ishikawa-type mixer for 10 minutes. Then, the mixture thus obtained was combined and mixed with the above insulating base material in Ishikawa-type mixer for 10 minutes to obtain 950 g. of a forming material.

Then, this forming material was filled in a metal mold having a width of 200 mm, a length of 330 mm and a depth (i.e. height) of 30 mm (the metal mold temperature: normal temperature). After placing a metal press member, the metal mold was inserted between heated plates having an elevated temperature of 170° C. and the heat compacting was immediately carried out under pressure of 200 kg/cm$^2$. After the forming material reached a temperature of 160° C., it was held under the same pressure and heating for further 5 minutes. Then, the heated plates were cooled down to 150° C. and the pressure was released, and a formed product having a thickness of about 5 mm, a width of 200 mm and a length of 330 mm was withdrawn.

The formed product was stepwise heated from 80° C. to 200° C. and held at 200° C. for 3 hours, whereupon an arc resistant insulator of the present invention was obtained.

The insulator was subjected to the following evaluations of the characteristics. As to the bending strength, a value at the normal state and a value at the normal state after heating the insulator at 500° C. for 3 hours followed by gradual cooling, were obtained according to JIS C 2210. As to the impact strength, a Charpy impact value was measured with respect to a sample having the original thickness, a width of 10 mm and a length of 90 mm without a notch.

The arc resistance was measured with respect to a sample having the original thickness, a width of 50 mm and a length of 50 mm. An arc proof tester was used as the testing device and the measurement was made in accordance with the gradation method of JIS K 6911.

The insulation resistance was measured in accordance with JIS K 6911 after drying the insulator at 150° C. for 4 hours on one hand, and after maintaining the insulator at 40° C. at a relative humidity of 90% for 100 hours on the other hand. A portable megger of 1000 V was used as the measuring device.

The through-layer breakdown voltage was measured with respect to a sample polished to have a thickness of 2 mm and left to stand under a normal state.

The water absorption rate and the solubility rate were measured with respect to a sample obtained by cutting the insulator to have the original thickness, a width of 50 mm and a length of 50 mm. After drying the sample at 150° C. for 4 hours, the weight ($W_0$) was measured, and then it was immersed in pure water for 24 hours and after wiping its surface with e.g. gauze, its weight ($W_1$) was measured. The water absorption rate was calculated by $(W_1-W_0)/W_0 \times 100$ (%). The sample was then dried at 150° C. for 4 hours, and its weight ($W_2$) was measured.

The solubility rate was calculated by $(W_0-W_2)/W_0 \times 100$ (%). After the calculation of the solubility rate, the change of the outer appearance of the sample was observed by naked eyes. Further, the chemical composition of the sample was determined by X-ray analysis.

In Table 1, the ratio of the constituent materials and the various characteristics obtained by the measurements are shown.

EXAMPLE 2

372 g. of aluminum hydroxide ($Al(OH)_3$, particle size: 200 to 300 mesh) and 232.5 g. of phlogopite powder ($KMg_3(AlSi_3O_{10}(OH)_2$, particle size: 60 to 100 mesh) as the mica powder, were mixed for 10 minutes in Ishikawa-type mixer to obtain an insulating base material. On the other hand, 151.6 g. of normal boric acid ($H_3BO_3$, particle size: 40 to 80 mesh), 34.2 g. of boric acid anhydride ($B_2O_3$, particle size: 40 to 80 mesh) and 139.7 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 930 g. of a forming material. Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 3

380 g. of aluminum oxide ($Al_2O_3$, particle size: 200 to 300 mesh) and 237.5 g. of muscovite powder ($KAl_2(AlSi_3O_{10})(OH)_2$, particle size: 60 to 100 mesh) as the mica powder were mixed for 10 minutes in Ishikawa-type mixer to obtain an insulating base material.

On the other hand, 176.5 g. of normal boric acid ($H_3BO_3$, particle size: 40 to 80 mesh), 34.2 g. of boric acid anhydride ($B_2O_3$, particle size: 40 to 80 mesh) and 116.2 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 950 g. of a forming material. Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 4

380 g. of aluminum oxide ($Al_2O_3$, particle size: 200 to 300 mesh) and 237.5 g. of fluorophlogopite powder ($KMg_3(AlSi_3O_{10})F_2$, particle size: 60 to 100 mesh) as the mica powder were mixed for 10 minutes in Ishikawa-type mixer to obtain an insulating base material.

On the other hand, 137.9 g. of normal boric acid ($H_3BO_3$, particle size: 40 to 80 mesh), 31.1 g. of boric acid anhydride ($B_2O_3$, particle size: 40 to 80 mesh) and 163.5 g. of zinc oxide (ZnO, particle size: 1 to 10μ) were mixed for 10 minutes in Ishikawa-type mixer to obtain 950 g. of a forming material.

Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 5

380 g. of aluminum oxide ($Al_2O_3$, particle size: 200 to 300 mesh) and 237.5 g. of phlogopite powder ($KMg_3(AlSi_3O_{10})(OH)_2$, particle size: 60 to 100 mesh) as the mica powder were mixed for 10 minutes in Ishikawa-type mixer to obtain an insulating base material.

On the other hand, 134.5 g. of normal boric acid ($H_3BO_3$, particle size: 40 to 80 mesh), 50.5 g. of boric acid anhydride ($B_2O_3$, particle size: 40 to 80 mesh) and 147.5 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 950 g. of a forming material.

Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 6

380 g. of aluminum oxide ($Al_2O_3$, particle size: 200 to 300 mesh) and 237.5 g. of phlogopite powder ($KMg_3(AlSi_3O_{10})(OH)_2$, particle size: 60 to 100 mesh) as the mica powder were mixed for 10 minutes in Ishikawa-type mixer to obtain an insulating base material.

On the other hand, 165.6 g. of normal boric acid ($H_3BO_3$, particle size: 40 to 80 mesh), boric acid anhydride ($B_2O_3$, particle size: 40 to 80 mesh) and 140.2 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 950 g. of a forming material.

Then, in the same manner as in Example 1, an arc resistant insulator having a thickness of about 5 mm, a width of 200 mm and a length of 330 mm was obtained. In Table 1, the ratio of the constituent materials and the vaious characteristics are shown.

EXAMPLE 7

235 g. of aluminum oxide ($Al_2O_3$, particle size: 200 to 300 mesh) and 235 g. of phlogopite powder ($KMg_3(AlSi_3O_{10})(OH)_2$, particle size: 60 to 100 mesh) as the mica powder were mixed for 10 minutes in Ishikawa-type mixer to obtain an insulating base material.

On the other hand, 218.9 g. of normal boric acid ($H_3BO_3$, particle size: 40 to 80 mesh), 49.4 g. of boric acid anhydride ($B_2O_3$, particle size: 40 to 80 mesh), 201.7 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 940 g. of a forming material.

Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 8

599.8 g. of aluminum oxide ($Al_2O_3$, particle size: 200 to 300 mesh) and 120.2 g. of phlogopite powder ($KMg_3(AlSi_3O_{10})(OH)_2$, particle size: 60 to 100 mesh) as the mica powder were mixed for 10 minutes in Ishikawa-type mixer to obtain an insulating base material.

On the other hand, 111.8 g. of normal boric acid ($H_3BO_3$, particle size: 40 to 80 mesh), 25.2 g. of boric acid anhydride ($B_2O_3$, particle size: 40 to 80 mesh) and 103 g. of zinc oxide (ZnO, particle size: 1 to 10μ) were mixed for 10 minutes in Ishikawa-type mixer. Then, the mixture thus obtained was combined and mixed with the above insulating base material for 10 minutes in Ishikawa-type mixer to obtain 960 g. of a forming material.

Then, in the same manner as in Example 1, an arc resistant insulator having a thickness of about 5 mm, a width of 200 mm and a length of 330 mm was obtained. In Table 1, the ratio of the constituent materials and the various characteristics are shown.

EXAMPLE 9

190 g. of aluminum oxide ($Al_2O_3$, particle size: 200 to 300 mesh), 190 g. of aluminum hydroxide ($Al(OH)_3$, particle size: 200 to 300 mesh), and 237.5 g. of phlogopite powder ($KMg_3(AlSi_3O_{10})(OH)_2$, particle size: 60 to 100 mesh) as the mica powder were mixed for 10 minutes in Ishikawa-type mixer to obtain an insulating base material.

On the other hand, 154.9 g. of normal boric acid ($H_3BO_3$, particle size: 40 to 80 mesh), 34.9 g. of boric acid anhydride ($B_2O_3$, particle size: 40 to 80 mesh) and 142.7 g. of zinc oxide (ZnO, particle size: 1 to 10$\mu$) were mixed for 10 minutes in Ishikawa-type mixer. Then, the mixture thus obtained was combined and mixed with the above insulating base material for 10 minutes in Ishikawa-type mixer to obtain 950 g. of a forming material.

Then, in the same manner as in Example 1, an arc resistant insulator having a thickness of about 5 mm, a width of 200 mm and a length of 330 mm was obtained. In Table 1, the ratio of the constituent materials and the various characteristics are shown.

COMPARATIVE EXAMPLE 1

A formed product having a thickness of 5 mm and composed of asbestos fibers and phosphoric acid or a metal phosphate was subjected to tests in the same manner as in Example 1. The test results are shown in Table 1.

COMPARATIVE EXAMPLE 2

A porcelain insulator used for an magnetic contactor was worked and subjected to tests in the same manner as in Example 1. The rest results are shown in Table 1.

COMPARATIVE EXAMPLE 3

A formed product having a thickness of 5 mm and composed of mica powder and low melting point glass (a lead glass type) was subjected to tests in the same manner as in Example 1. The test results are shown in Table 1.

TABLE 1

| Ratios of the materials and characteristics | Example 1 | Example 2 | Example 3 | Example 4 | Example 5 | Example 6 |
|---|---|---|---|---|---|---|
| Weight ratios of the insulating base materials | | | | | | |
| $Al_2O_3$ | 1 | | 1 | 1 | 1 | 1 |
| $Al(OH)_3$ | | 1 | | | | |
| Mica powder | 0.625 | 0.625 | 0.625 | 0.625 | 0.625 | 0.625 |
| Molar ratios of the materials for forming zinc borate hydrate | | | | | | |
| $H_3BO_3$ | 5 | 5 | 5 | 5 | 3 | 7 |
| $B_2O_3$ | 1 | 1 | 1 | 1 | 1 | 1 |
| ZnO | 3.5 | 3.5 | 2.5 | 4.5 | 2.5 | 4.5 |
| Contents of the insulating base materials (%) | 65 | 65 | 65 | 65 | 65 | 65 |
| Bending strength (kg/mm$^2$) | | | | | | |
| Normal state | 7.5 | 6.2 | 7.0 | 6.8 | 7.8 | 6.2 |
| After heating at 500° C. for 3 hrs. | 6.9 | 4.8 | 5.8 | 6.5 | 7.4 | 5.3 |
| Charpy impact strength (kg-cm/cm$^2$) | 4.8 | 3.9 | 4.2 | 3.7 | 5.1 | 4.5 |
| Arc resistance (sec) | >420 | >420 | >420 | >420 | >420 | >420 |
| Insulating resistance (M$\Omega$) | | | | | | |
| After drying at 150° C. | >5000 | >5000 | >5000 | >5000 | >5000 | >5000 |
| 40° C.-90% RH 100 hrs. | 220 | 160 | 110 | 125 | 100 | 140 |
| Through layer breakdown voltages (KV/mm) | 10.5 | 8.7 | 7.7 | 7.5 | 10.7 | 6.8 |
| Water absorption rate (%) | 2.54 | 3.81 | 4.28 | 3.92 | 2.28 | 4.44 |
| Solubility rate (%) | 0.38 | 0.54 | 0.87 | 0.29 | 0.91 | 0.18 |
| Outer appearance after the solubility test | Normal | Normal | Normal | Normal | Normal | Normal |
| Composition of the composite | $Al_2O_3$ (abundant) | $Al(OH)_3$ (abundant) | $Al_2O_3$ (abundant) | $Al_2O_3$ (abundant) | $Al_2O_3$ (abundant) | $Al_2O_3$ (abundant) |
| Compositions as measured by X-ray diffractiometry | Mica (abundant) * | Mica (abundant) * | Mica (abundant) * | Mica (abundant) * | Mica (abundant) * | Mica (abundant) * |

| Ratios of the materials and characteristics | Example 7 | Example 8 | Example 9 | Comparative Example 1 | Comparative Example 2 | Comparative Example 3 |
|---|---|---|---|---|---|---|
| Weight ratios of the insulating base materials | | | | | | |
| $Al_2O_3$ | 1 | 1 | 0.5 | | | |
| $Al(OH)_3$ | | | 0.5 | | | |
| Mica powder | 1 | 0.2 | 0.625 | | | |
| Molar ratios of the materials for forming zinc borate hydrate | | | | | | |
| $H_3BO_3$ | 5 | 5 | 5 | | | |

TABLE 1-continued

|  |  |  |  |  |  |  |
|---|---|---|---|---|---|---|
| $B_2O_3$ | 1 | 1 | 1 |  |  |  |
| ZnO | 3.5 | 3.5 | 3.5 |  |  |  |
| Contents of the insulating base materials (%) | 50 | 75 | 65 |  |  |  |
| Bending strength (kg/mm$^2$) |  |  |  |  |  |  |
| Normal state | 4.9 | 5.9 | 6.7 | 6.8 | 4.2 | 8.1 |
| After heating at 500° C. for 3 hrs. | 4.7 | 5.4 | 6.1 | 4.2 | 4.1 | ** |
| Charpy impact strength (kg-cm/cm$^2$) | 3.5 | 4.3 | 4.4 | 4.5 | 1.5 | 3.8 |
| Arc resistance (sec) | >420 | >420 | >420 | 300 | >420 | 240 |
| Insulating resistance (MΩ) |  |  |  |  |  |  |
| After drying at 150° C. | >5000 | >5000 | >5000 | 1000 | >5000 | >5000 |
| 40° C.-90% RH 100 hrs. | 120 | 120 | 200 | 7 | 250 | 480 |
| Through layer breakdown voltages (KV/mm) | 6.5 | 6.3 | 9.2 | 3.4 | 8.5 | 11.8 |
| Water absorption rate (%) | 4.51 | 4.62 | 3.3 | 6.8 | 0.58 | 0.22 |
| Solubility rate (%) | 0.28 | 0.35 | 0.5 | 5.2 | 0.05 | 0.11 |
| Outer appearance after the solubility test | Normal | Normal | Normal | Elution, color change | Normal | Normal |
| Compositions of the composite Compositions as measured by X-ray diffractiometry | $Al_2O_3$ (abundant) Mica (abundant) * | $Al_2O_3$ (abundant) Mica (abundant) * | $Al_2O_3$ (abundant) $Al(OH)_3$ (abundant) Mica (abundant) * |  |  |  |

*$2ZnO.3B_2O_3.3H_2O$ (abundant)
$2ZnO.3B_2O_3.7H_2O$ (very small amount)
$\alpha ZnO.B_2O_3$ (very small amount)
Unknown crystal (very small amount)
**Glass melted and underwent deformation It is apparent from Table 1 that the arc resistant insulators of the present invention are superior to the insulator of Comparative Example 1 in the electric insulating performance in a high humidity condition and in the water resistance (the solubility rate is smaller) and they are superior to the insulator of Comparative Example 2 particularly in the impact strength.

Comparative Example 3 represents an insulator made of mica powder. However, in such an insulator, the heat resistance tends to fluctuate depending upon the melting point of the low melting point glass, and when heated at a temperature of 500° C., the glass will fuse and the insulator undergoes deformation. Thus, the insulator has a lower heat resistance temperature than the arc resistant insulators of the present invention and is inferior also in the arc resistance.

Further, in Comparative Example, asbestos fibers are used, which are designated as a specified chemical substance under labour hygienic regulations and required to take a special caution for their handling.

The insulator of Comparative Example 2 is inferior in the impact strength and is not suitable for use in an environment where the insulator is subject to dynamic action such as vibrations. The insulator of Comparative Example 3 has, in addition to the abovementioned drawback that the heat resistance is influenced by the glass for binding the mica powder, an additional drawback that in the production of the insulator of this type, it is necessary to raise the temperature at a level of e.g. at least 500° C. so as to fuse the glass, whereby the production costs are inevitably high which will then lead to a high price of the product.

The arc resistant insulators of the present invention do not contain a specified chemical substance such as asbestos and they are composed of the materials which are safer for their handling.

Further, by virtue of a matrix of the composite composition comprising the insulating base material composed of mica powder and aluminum oxide and/or aluminum hydroxide and the zinc borate hydrate, the insulators of the present invention have superior impact strength and they can be used without troubles as arc-extinguishing plates for e.g. vehicles which are subject to vibrations. Further, since they can readily be prepared by compacting the forming material under heating at a temperature of from 160° to 200° C., the production costs can be reduced, and it is thereby possible to provide inexpensive products.

In the case where mica powder and glass are used (Comparative Example 3), the heat resistance is affected by the melting point of the glass as mentioned above, and if an attempt is made to increase the heat resistance by using glass having a high melting point, the preparation will then be rather complicated and will be likely to lead to very expensive products. The composite composition of the present invention as opposed to such glass, can be prepared at a low temperature and has high heat resistance (i.e. at least 900° C.).

Further, the insulators obtained by the Examples were tested by applying arcs repeatedly to the surface of the insulators at DC 1500 V and 1000 A. The glassy substance formed by the impingement of the arcs did not fall off, and the insulators were found to be highly durable arc resistance insulators capable of effectively shut off the arcs.

Having thus described the present invention, the arc resistance insulators of the invention have superior heat resistance, water resistance, and electrical insulating property as well as good arc resistance. They may be advantageously applied not only to arc extinguishing plates but also to non-flammable heat resistant insulators for electric appliances where heat resistance is required, such as insulating washers, insulating frames or insulating spacers.

We claim:

1. An arc resistant insulator which is composed of a matrix of a composite composition comprising an insulating base material containing aluminum oxide and/or aluminum hydroxide and mica powder, and a zinc borate hydrate composed essentially of $2ZnO.3B_2O_3.3H_2O$.

2. The arc resistant insulator according to claim 1 wherein the insulating base material contains 1 part by weight of aluminum oxide and/or aluminum hydroxide and from 0.2 to 1 part by weight of mica powder.

3. The arc resistant insulator according to claim 1 wherein the zinc borate hydrate composed essentially of $2ZnO.3B_2O_3.3H_2O$ is formed by a mixture comprising from 3 to 7 moles of normal boric acid, 1 mole of boric acid anhydride and from 2.5 to 4.5 moles of zinc oxide.

4. The arc resistant insulator according to claim 3 wherein in a forming material comprising the insulating base material and the mixture for forming the zinc borate hydrate composed essentially of $2ZnO.3B_2O_3.3H_2O$, the insulating base material constitutes from 50 to 75% by weight.

5. A process for preparing an arc resistant insulator which comprises mixing an insulating base material composed of aluminum oxide and/or aluminum hydroxide and mica powder with a zinc borate hydrate forming material composed of normal boric acid, boric acid anhydride and zinc oxide, and heating and compacting the mixture thus obtained in a closed system at a temperature of at least 155° C. under pressure of at least 50 $kg/cm^2$ to form a formed product.

6. The process according to claim 5 wherein from 50 to 75% by weight of the insulating base material is mixed with from 25 to 50% by weight of the zinc borate hydrate forming material.

7. The process according to claim 6 wherein the insulating base material is composed of 1 part by weight of aluminum oxide and/or aluminum hydroxide and from 0.2 to 1 part by weight of mica powder.

8. The process according to claim 5, 6 or 7 wherein the zinc borate hydrate forming material is composed of from 3 to 7 moles of normal boric acid, 1 mole of boric acid anhydride and from 2.5 to 4.5 moles of zinc oxide.

9. The process according to claim 5, 6 or 7 wherein the temperature for heating is within a range of from 160° to 200° C.

10. The process according to claim 5, 6 or 7 wherein the formed product is further heated at a temperature of from 160° to 200° C.

* * * * *